United States Patent
Thorpe et al.

(10) Patent No.: US 8,311,100 B2
(45) Date of Patent: Nov. 13, 2012

(54) INFORMATION HANDLING METHOD FOR MAPPING INFORMATION ITEMS TO RESPECTIVE NODES

(75) Inventors: Jonathan Richard Thorpe, Winchester (GB); Paul Edward Prayle, Basingstoke (GB); Mikael Carl Lang, Surbiton (GB)

(73) Assignee: Sony United Kingdom Limited, Weybridge (GB)

( * ) Notice: Subject to any disclaimer, the term of this patent is extended or adjusted under 35 U.S.C. 154(b) by 1293 days.

(21) Appl. No.: 11/129,816

(22) Filed: May 16, 2005

(65) Prior Publication Data

US 2006/0143230 A1  Jun. 29, 2006

(30) Foreign Application Priority Data

Dec. 9, 2004 (GB) .................................. 0427041.9

(51) Int. Cl.
 *H04N 7/12* (2006.01)
(52) U.S. Cl. .................................. 375/240.08
(58) Field of Classification Search ............... 375/240.08
 See application file for complete search history.

(56) References Cited

U.S. PATENT DOCUMENTS

| | | | | |
|---|---|---|---|---|
| 4,959,870 | A * | 9/1990 | Tachikawa | 382/253 |
| 5,999,893 | A * | 12/1999 | Lynch et al. | 702/181 |
| 6,038,337 | A | 3/2000 | Lawrence et al. | |
| 6,397,200 | B1 | 5/2002 | Lynch, Jr. et al. | |
| 6,466,926 | B1 * | 10/2002 | Kawatani | 706/20 |
| 6,774,917 | B1 | 8/2004 | Foote et al. | |
| 6,789,070 | B1 * | 9/2004 | Willett et al. | 706/20 |
| 2003/0147556 | A1 | 8/2003 | Gargesha et al. | |

FOREIGN PATENT DOCUMENTS

| | | |
|---|---|---|
| EP | 1 426 881 | 6/2004 |
| GB | 2 395 806 | 6/2004 |
| WO | WO 2004/010329 A1 | 1/2004 |

OTHER PUBLICATIONS

"Self Organisation of a Massive Document Collection", Kohonen et al, IEEE Transactions on Neural Networks, vol. 11, No. 3, May 2000, pp. 574-585.

(Continued)

*Primary Examiner* — David Czekaj
*Assistant Examiner* — Tracy Li
(74) *Attorney, Agent, or Firm* — Oblon, Spivak, McClelland, Maier & Neustadt, L.L.P.

(57) ABSTRACT

An information handling method in which information items are mapped to respective nodes in an array of nodes by mutual similarity of the information items, such that similar information items map to nodes at similar positions in the array of nodes; a mapping relationship being defined between feature data relating to an information item and nodes in the array of nodes comprises the steps of:
 (a) for each of a group of information items:
 detecting feature data representing each of a set of properties of that information item;
 (b) for the ensemble of feature data corresponding to the group of information items:
 detecting more significant and less significant properties within the ensemble;
 discarding feature data relating to less significant properties, the remaining non-discarded feature data being associated so as to generate a reduced feature vector for each information item;
 (c) defining a mapping between the reduced feature vectors and nodes in the array of nodes.

23 Claims, 9 Drawing Sheets

OTHER PUBLICATIONS

Jian Kang Wu, "Formalism for Content-based Retrieval Multimedia Systems", Systems, Man, and Cybernetics, 1997. Computational Cybernetics and Simulation. 1997 IEEE International Conference on Orlando, XP010249072, vol. 4, Oct. 12, 1997, pp. 3108-3113.

Teuvo Kohonen, et al., "Self Organization of a Massive Document Collection", IEE Transactions on Neural Networks, XP002259639, vol. 11, No. 3, May 2000, pp. 574-585.

Chinese Office Action issued May 3, 2012 in patent application No. 200510137046.9 (English translation only).

* cited by examiner

INFORMATION HANDLING METHOD FOR MAPPING INFORMATION ITEMS TO RESPECTIVE NODES

BACKGROUND OF THE INVENTION

1. Field of the Invention

This invention relates to information handling.

2. Description of the Prior Art

There are many established systems for locating information (e.g. documents, images, emails, patents, internet content or media content such as audio/video content) by searching under keywords. Examples include internet search "engines" such as those provided by "Google"™ or "Yahoo"™ where a search carried out by keyword leads to a list of results which are ranked by the search engine in order of perceived relevance.

However, in a system encompassing a large amount of content, often referred to as a massive content collection, it can be difficult to formulate effective search queries to give a relatively short list of search "hits". For example, at the time of preparing the present application, a Google search on the keywords "massive document collection" drew 1470000 hits. This number of hits would be expected to grow if the search were repeated later, as the amount of content stored across the internet generally increases with time. Reviewing such a list of hits can be prohibitively time-consuming.

In general, some reasons why massive content collections are not well utilised are:

a user doesn't know that relevant content exists a user knows that relevant content exists but does not know where it can be located a user knows that content exists but does not know it is relevant a user knows that relevant content exists and how to find it, but finding the content takes a long time The paper "Self Organisation of a Massive Document Collection", Kohonen et al, IEEE Transactions on Neural Networks, Vol 11, No. 3, May 2000, pages 574-585 discloses a technique using so-called "self-organising maps" (SOMs). These make use of so-called unsupervised self-learning neural network algorithms in which "feature vectors" representing properties of each document are mapped onto nodes of a SOM.

In the Kohonen et al paper, a first step is to pre-process the document text, and then a feature vector is derived from each pre-processed document. In one form, this may be a histogram showing the frequencies of occurrence of each of a large dictionary of words. Each data value (i.e. each frequency of occurrence of a respective dictionary word) in the histogram becomes a value in an n-value vector, where n is the total number of candidate words in the dictionary (43222 in the example described in this paper). Weighting may be applied to the n vector values, perhaps to stress the increased relevance or improved differentiation of certain words.

The n-value vectors are then mapped onto smaller dimensional vectors (i.e. vectors having a number of values m (500 in the example in the paper) which is substantially less than n. This is achieved by multiplying the vector by an (n×m) "projection matrix" formed of an array of random numbers. This technique has been shown to generate vectors of smaller dimension where any two reduced-dimension vectors have much the same vector dot product as the two respective input vectors.

The reduced dimension vectors are then mapped onto nodes (otherwise called neurons) on the SOM by a process of multiplying each vector by a "model" (another vector). The models are produced by a learning process which automatically orders them by mutual similarity onto the SOM, which is generally represented as a two-dimensional grid of nodes. This is a non-trivial process which took Kohonen et al six weeks on a six-processor computer having 800 MB of memory, for a document database of just under seven million documents. Finally the grid of nodes forming the SOM is displayed, with the user being able to zoom into regions of the map and select a node, which causes the user interface to offer a link to an internet page containing the document linked to that node.

It is an object of the invention to provide improved information handling techniques.

SUMMARY OF THE INVENTION

This invention provides an information handling method in which information items are mapped to respective nodes in an array of nodes by mutual similarity of said information items, such that similar information items map to nodes at similar positions in said array of nodes; a mapping relationship being defined between feature data relating to an information item and nodes in said array of nodes; said method comprising the steps of:

(a) for each of a group of information items:

detecting feature data representing each of a set of properties of that information item;

(b) for the ensemble of feature data corresponding to said group of information items:

detecting more significant and less significant properties within said ensemble;

associating said feature data relating to more significant properties so as to generate a reduced feature vector for each information item;

(c) defining a mapping between said reduced feature vectors and nodes in said array of nodes.

The invention addresses the generation and mapping of feature data (e.g. in the form of so-called "feature vectors") in an advantageous way which is suitable not only for the very sparsely populated vectors typical of the Kohonen paper but also for much more fully populated feature data typical of that obtained by, for example, analysis of audio or video properties of an audio/video information item. Here, it is noted that the invention involves the recognition that the feature vector reduction techniques described earlier are unsuitable where the vectors are not sparsely populated.

A detection technique (such as, for example, principal component analysis) is used to detect which of the detected features are more statistically significant. Feature data defining less significant properties is discarded across the whole group of information items. This in itself allows a reduced amount of calculation to be carried out to achieve a useful mapping.

But, in a preferred embodiment, data defining which feature data was discarded for that group is stored. This means that when a new information item is to be added to the group, or a new search query applied, the reduced feature vectors can be generated directly, saving further processing resources.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
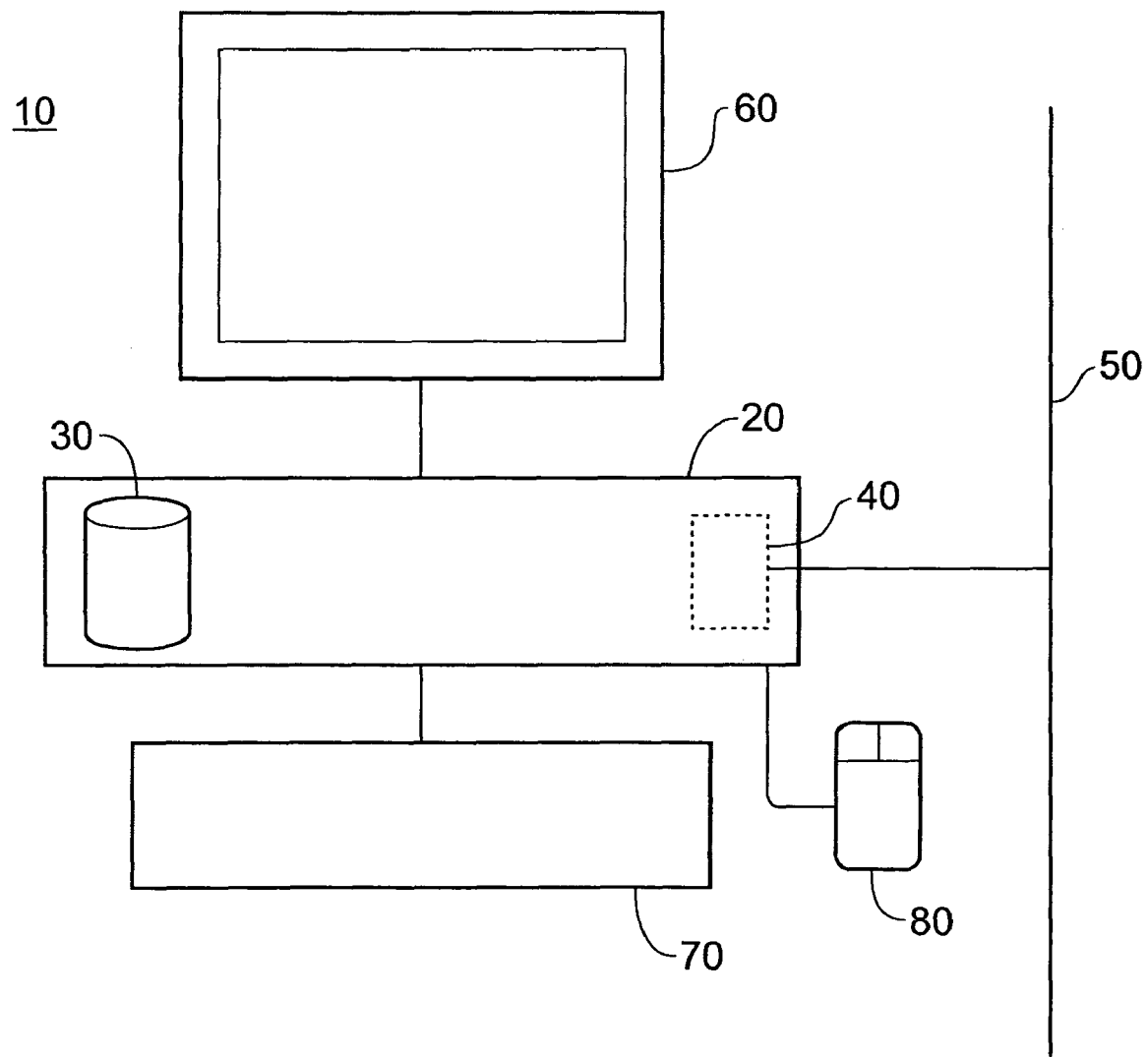
FIG. 1 schematically illustrates an information storage and retrieval system.

FIG. 1 is a schematic diagram of an information storage and retrieval system based around a general-purpose computer 10 having a processor unit 20 including disk storage 30 for programs and data, a network interface card 40 connected to a network 50 such as an Ethernet network or the Internet, a display device such as a cathode ray tube device 60, a keyboard 70 and a user input device such as a mouse 80. The system operates under program control, the programs being stored on the disk storage 30 and provided, for example, by the network 50, a removable disk (not shown) or a pre-installation on the disk storage 30.

The storage system operates in two general modes of operation. In a first mode, a set of information items (e.g. textual information items) is assembled on the disk storage 30 or on a network disk drive connected via the network 50 and is sorted and indexed ready for a searching operation. The second mode of operation is the actual searching against the indexed and sorted data.

The embodiments are applicable to many types of information items. A non-exhaustive list of appropriate types of information includes patents, video material, emails, presentations, internet content, broadcast content, business reports, audio material, graphics and clipart, photographs and the like, or combinations or mixtures of any of these. In the present description, reference will be made to audio/video information items, or at least information items having an audio and/or video content or association. For example, a piece of broadcast content such as audio and/or video material may have associated "MetaData" defining that material in textual terms.

The information items are loaded onto the disk storage 30 in a conventional manner. Preferably, they are stored as part of a database structure which allows for easier retrieval and indexing of the items, but this is not essential. Once the information and items have been so stored, the process used to arrange them for searching is shown schematically in FIG. 2.

It will be appreciated that the indexed information data need not be stored on the local disk drive 30. The data could be stored on a remote drive connected to the system 10 via the network 50. Alternatively, the information may be stored in a distributed manner, for example at various sites across the internet. If the information is stored at different internet or network sites, a second level of information storage could be used to store locally a "link" (e.g. a URL) to the remote information, perhaps with an associated summary, abstract or MetaData associated with that link. So, the remotely held information would not be accessed unless the user selected the relevant link (e.g. from the results list 260 to be described below), although for the purposes of the technical description which follows, the remotely held information, or the abstract/summary/MetaData, or the link/URL could be considered as the "information item".

In other words, a formal definition of the "information item" is an item from which a feature vector is derived and processed (see below) to provide a mapping to the SOM. The data shown in the results list 260 (see below) may be the information item itself (if it is held locally and is short enough for convenient display) or may be data representing and/or pointing to the information item, such as one or more of MetaData, a URL, an abstract, a set of key words, a representative key stamp image or the like. This is inherent in the operation "list" which often, though not always, involves listing data representing a set of items.

In a further example, the information items could be stored across a networked work group, such as a research team or a legal firm. A hybrid approach might involve some information items stored locally and/or some information items stored across a local area network and/or some information items stored across a wide area network. In this case, the system could be useful in locating similar work by others, for example in a large multi-national research and development organisation, similar research work would tend to be mapped to similar output nodes in the SOM (see below). Or, if a new television programme is being planned, the present technique could be used to check for its originality by detecting previous programmes having similar content.

It will also be appreciated that the system 10 of FIG. 1 is but one example of possible systems which could use the indexed information items. Although it is envisaged that the initial (indexing) phase would be carried out by a reasonably powerful computer, most likely by a non-portable computer, the later phase of accessing the information could be carried out at a portable machine such as a "personal digital assistant" (a term for a data processing device with display and user input devices, which generally fits in one hand), a portable computer such as a laptop computer, or even devices such as a mobile telephone, a video editing apparatus or a video camera. In general, practically any device having a display could be used for the information-accessing phase of operation.

The processes are not limited to particular numbers of information items.

Figure 2:
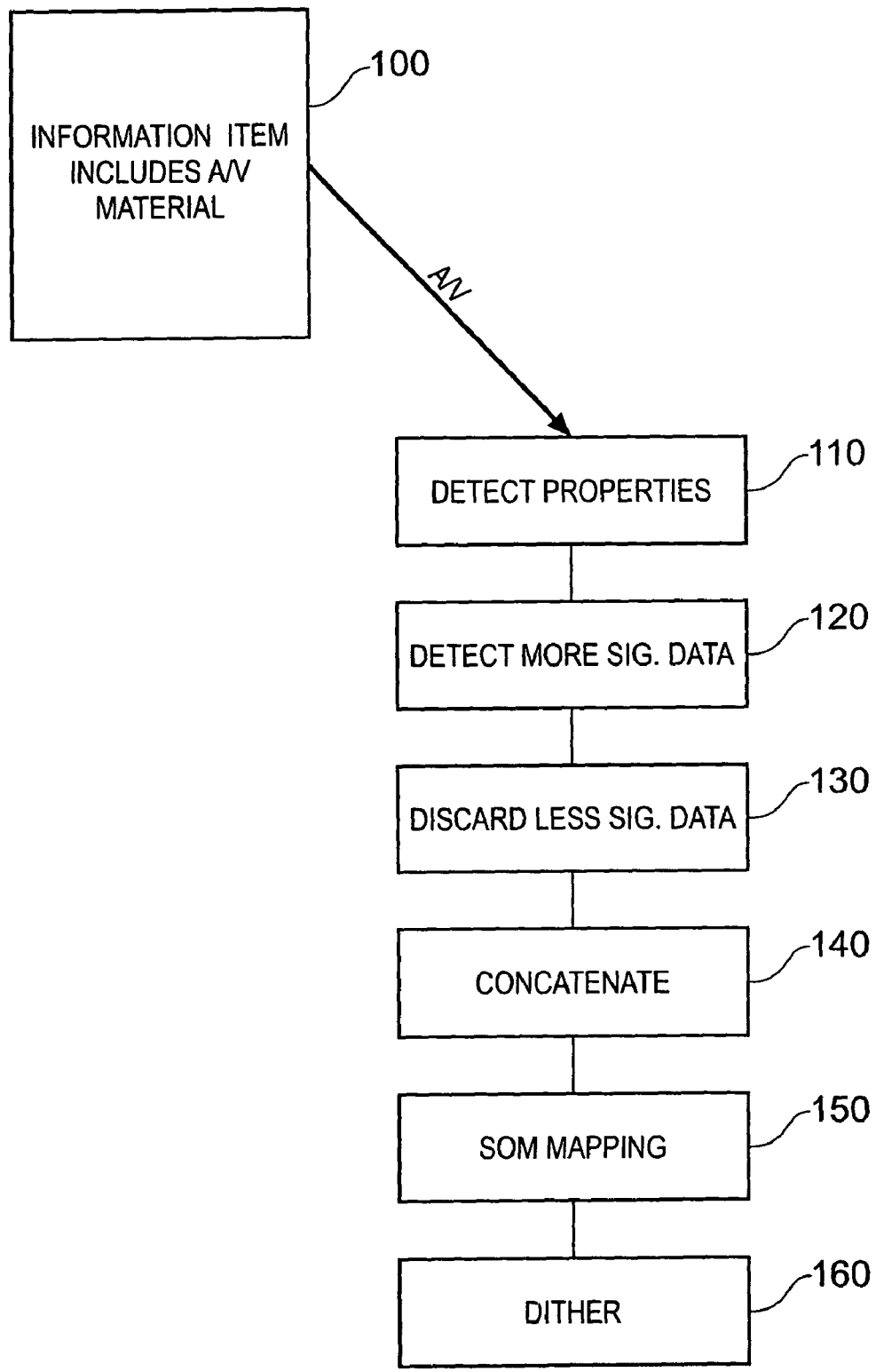
FIG. 2 is a schematic flow chart showing the generation of a self-organising map (SOM)
Figure 3:
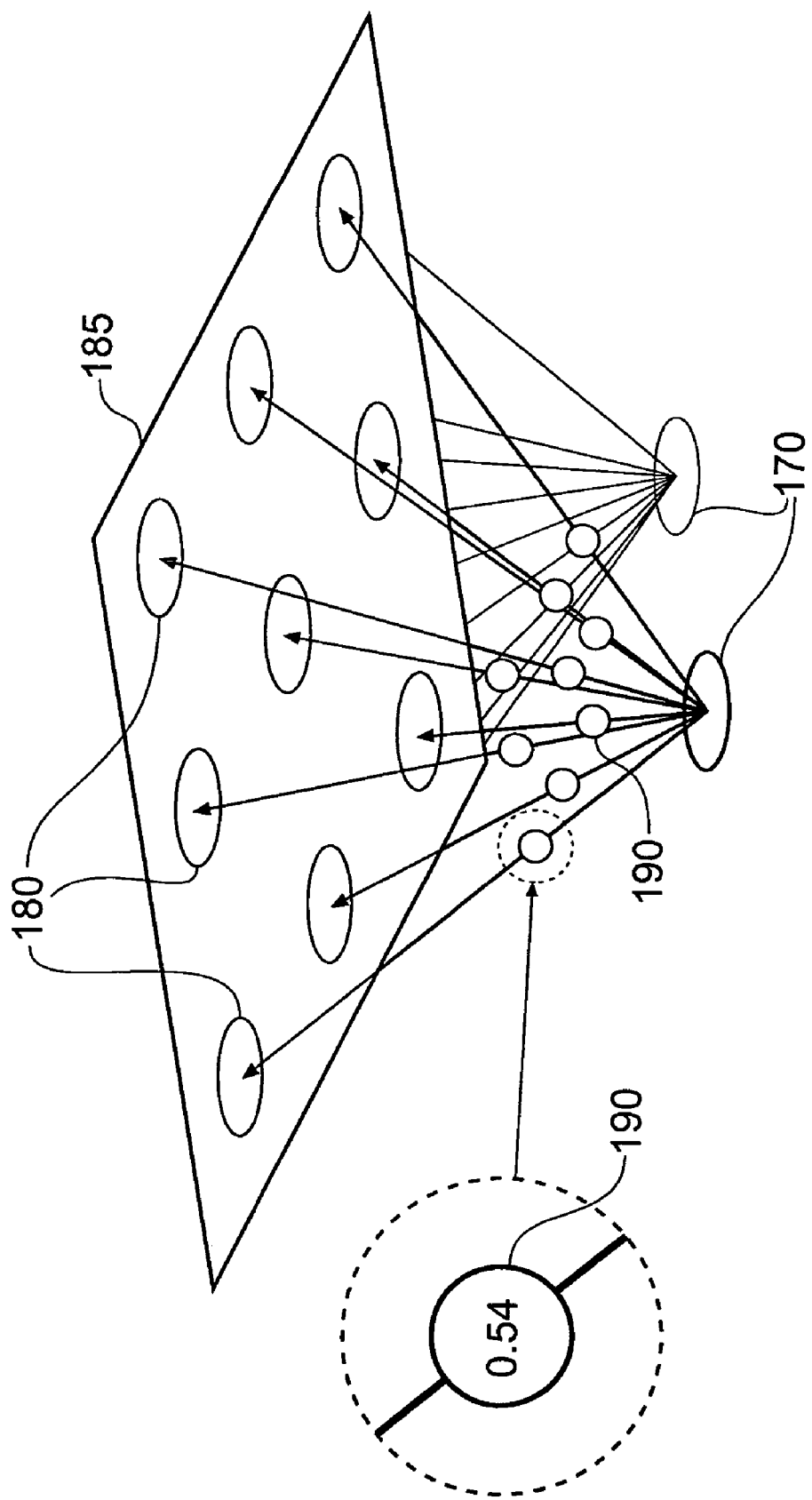
FIG. 3 schematically illustrates an SOM.

The process of generating a self-organising map (SOM) representation of the information items will now be described with reference to FIGS. 2 to 4. FIG. 2 is a schematic flow chart illustrating a so-called "feature extraction" process followed by an SOM mapping process.

Feature extraction is the process of transforming raw data into an abstract representation. These abstract representations can then be used for processes such as pattern classification, clustering and recognition. In this process, a so-called "feature vector" is generated, which is an abstract representation of the frequency of terms used within a document.

The basic steps of FIG. 2 are carried out in respect of information items 100 in a group of information items including audio and/or video material, as follows:

Audio and/or video properties of each information item in turn are detected at a step 110. At steps 120 and 130, a process of detecting the more significant and less significant property data is carried out, leading to the discarding of less significant property data. The remaining (non-discarded) property data is concatenated at a step 140 to generate a "reduced" feature vector. Once the "reduced" feature vectors have been generated for the information item collection, they are projected into a two-dimensional SOM at a step 150 to create a semantic map. Finally a "dither" function (see below) is applied at a step 160.

As will be seen below, the steps 120 to 140 could be carried out in another order, so that the data is discarded after concatenation (or indeed the discarding process could occur before or after concatenation). Advantages of each approach will be discussed below.

The steps 110 to 140 will now be described in detail.

The aim of the technique is to automatically extract (from audio and video) a feature vector that represents a media items genre with as few variables as possible or at least a reduced number of variables); this feature vector is from now on called "reduced feature vector".

The reduced feature vector consists of a combination of several "basic feature vectors". The basic feature vectors encapsulate a specific type of feature like colours, shape etc.

To create a reduced feature vector it is first necessary to answer the following questions:

Which basic feature vectors are suitable to use for the reduced feature vector creation?

Which is the best way to combine the basic feature vectors to form a reduced feature vector?

Do the basic feature vectors and the reduced feature vectors contain any redundant data, if so can we remove it?

It was decided to use two different data sets for the purposes of empirical tests of the embodiments. The first one consists of 697 five-min edited-clips from various television shows and is from now on called "TV material". The second data set consists of 442 unedited-clips of various lengths (from between about five seconds and about five minutes) and has a classification based on the background environment, this data set is from now on called "DV material". Each data set is divided in to 6 different genres/types.

TV Genres
   Animation
   Game Show
   News
   Soap
   Sport
   Talk Show

DV Genres
   CAR
   DIVING
   FASHION
   SAILING
   SOUTH POLE
   TRAIN

As the core technology is based on the Self Organising Map (SOM), the success of the feature vectors may be measured in "organisation accuracy". The organisation accuracy is calculated in the following way:

Each node in the SOM can attract several objects; these objects might be from the same genre or from different genres. The goal is that each node should only attract one type of genre. As a measurement of success each node in the SOM is classified by its dominant genre and calculate the percentage that the dominant genre constitutes of the total amount of items related to the node. This percentage is averaged over all the nodes in the SOM and is from now on called "organisation accuracy".

Creation of the Basic Feature Vectors

There are four types of basic feature vectors that we have used in this first part of the experiment; these are Colour, Shape, Audio, Face and Edge/plain based feature vectors. Many of the results described below were derived without the edge/plain vector, but similar principles apply and it should be understood that the edge/plain vector can be used in addition to (or instead of one of) the permutations set out below. It should also be understood that the permutations set out below are simply examples, and that other permutations of vectors could be used.

Colour

There are several colour models that could be used. To establish which one that is the best one for our purpose, several were tried.

For each colour model experiment, a 20-bin histogram was calculated for each frame in a media item, the average and standard deviation for each column in the histogram is taken over the whole media item. The average and standard deviation vectors are used as basic feature vectors representing a media item. The concatenation of the average and standard deviation is also used us a basic feature vectors and is then called "combination" in the list below. The colour models and feature vectors calculated from them are the following ones:

HUE Histogram
   Average
   Standard Deviation
   Combination (concatenated average and Standard Deviation vectors)

Luminance Histogram
   Average
   Standard Deviation
   Combination (concatenated average and Standard Deviation vectors)

Red Histogram
   Average
   Standard Deviation
   Combination (concatenated average and Standard Deviation vectors)

Green Histogram
   Average
   Standard Deviation
   Combination (concatenated average and Standard Deviation vectors)

Blue Histogram
Average
Standard Deviation
Combination (concatenated average and Standard Deviation vectors)
   RGB Histogram (60 bins, combination of three different histograms)
Average
Standard Deviation
Combination (concatenated average and Standard Deviation vectors)

Shape

Two different types of shape descriptors were tested; the difference between them is the step after the Fast Fourier Transform (FFT), step 4. Overall the shape descriptor is extracted in the following way:

1. Each frame is resized to an 64*64 image, for example by bilinear interpolation
2. The FFT is taken from the resized frame.
3. The first 10 frequencies (lowest frequencies) in each direction are combined to a 100-value long feature vector.
4. Two different types of feature vector are produced here:
   i. normal FFT, i.e. nothing is done to the vector
   ii. Magnified FFT is when each value in the feature vector is processed by the following formula.

$$D(u,v)=10*\log(1+|F(u,v)|)$$

5. The average and standard deviation for each column in the vector is taken over the whole media item, which gives three feature vectors per post processing method.
   i. Average
   ii. Standard Deviation
   iii. Combination (average and standard deviation feature vector concatenated)

Face

Two different types of face based feature vectors were tested; one called "face features" and the other one called "face statistics".

The face statistics basic feature vector is generated as follows:

1. For each frame, calculate the following 3 variables:
   Face count, i.e. how many faces there are within the frame
   Average face size for all the faces within the frame
   Averagex(horizontal) position for all the faces in the frame
2. The average and standard deviation are then calculated for all the 3 variables over all the frames within the media item
3. The average and standard deviation for the face-count, size and x-position form a 6 variable feature vector.

The face features basic feature vector is generated as follows:

1. A face classifier that classifies all the faces in a frame into 6 different classes depending on face size and face x-position is used.

The face classifier works in the following way:
a. If the size of a face is bigger than 21 pixels (e.g. in width) it is classified as subclass A, and if it is smaller than 21 pixels it is classified as subclass B.
b. Both subclass A and B are split to three different subclasses, depending on if the face x-position is less than 74 (e.g. pixels from the left), between 74 and 114 or above 114.
2. Each media item has a 7-bin histogram, where the first bin represents frames with no faces; the other bins represent the 6 different face classes. For each frame being analysed each face found increases the bin that its classification belong to by one.
3. The histogram forms a 7-bin basic feature vector that represents a media item.

Audio

The available audio has a sample rate of 48 kHz; the audio is sampled in 32 ms windows with 16 ms overlap, giving a total of N=1536 samples. The rms amplitude is defined as $$r_j = \sum_{i=1}^{N}(s_i)^2$$

and a frame is defined as silent if $r_j < 0.2 * \bar{r}$ where j is the audio frame and $\bar{r}$ the average rms amplitude over the entire media item.

First, the entire signal is hamming-windowed with $$W_i = 0.54 - 0.46 * \cos\left(\frac{2\pi i}{N}\right)$$

and thereafter the FFT coefficients $F(\omega)$ are calculated for all the frames. Then the following features are calculated for each audio frame:

Total Spectrum Power. The logarithm of the spectrum power is used:

$$P = \log\left(\int_0^{\omega_0} |F(\omega)|^2 d\omega\right)$$

where $|F(\omega)|^2$ represents the power at frequency $\omega$ and where, $\omega_0 = 24$ kHz, the half sampling frequency.

Subband Powers. Four subband powers with the following intervals are used $$\left[0, \frac{\omega_0}{8}\right], \left[\frac{\omega_0}{8}, \frac{\omega_0}{4}\right], \left[\frac{\omega_0}{4}, \frac{\omega_0}{2}\right] \text{ and } \left[\frac{\omega_0}{2}, \omega_0\right].$$

The power of the subband is calculated the following way:

$$P_j = \log\left(\int_{L_j}^{H_j} |F(\omega)|^2 d\omega\right)$$

where $H_j$ represents the highest frequency and $L_j$ represents the lowest frequency in the interval.

Brightness. Brightness is defined as the frequency centroid, and is calculated the following way.

$$\omega_c = \frac{\int_0^{\omega_0} \omega * |F(\omega)|^2 d\omega}{\int_0^{\omega_0} |F(\omega)|^2 d\omega}$$

Bandwidth. Bandwidth B is calculated the following way:

$$B = \frac{\int_0^{\omega_0} (\omega - \omega_c)^2 * |F(\omega)|^2 d\omega}{\int_0^{\omega_0} |F(\omega)|^2 d\omega}$$

Pitch Frequency

The pitch frequency is determined in the following way:
1. The power spectrum is calculated for each audio frame
2. The power spectrums peaks are emphasised with the discrete operator: {0.25f,0.75f,1.0f,0.75f,0.25f}.
3. The harmonic of the audio window is calculated the following way:
   a. A comb filter that starts with pitch 50 Hz is increased successively until it reaches a pitch of 1000 Hz. For each step the difference between the comb filtered signal "C" and the noise "N" taken.
   i. The comb filter value is calculated in the following way:
      $C_i = 2.25 * S_{i-1} + 1.5 * S_1 + 2.25 * S_{i+1}$ where "1" is the pitch frequency and "S" the enhanced signal. Observe that if S=1 for [i-1, i, i+1] then C=6.
   ii. The noise is calculated the following way:

$$N_i = S_{i-\frac{4*i}{6}} + S_{i-\frac{3*i}{6}} + S_{i-\frac{2*i}{6}} + S_{i+\frac{2*i}{6}} + S_{i+\frac{3*i}{6}} + S_{i+\frac{4*i}{6}}$$

Observe that is S=1 for $$\left[i - \frac{4*i}{6}, i - \frac{3*i}{6}, i - \frac{3*i}{6}, i + \frac{2*i}{6}, i + \frac{3*i}{6}, i + \frac{4*i}{6}\right] \text{ then } N = 6.$$

4. This will form a frequency vs. harmonic diagram; the peak of the harmonics gives the pitch frequency.

Mel-Frequency cepstral Coefficients are computed from the FFT power coefficients. A triangular bandpass filter bank filters the coefficients. The filter bank consists of 19-triangular filters with constant mel-frequency intervals covering the frequency range 0-4000 Hz. $S_k$ {k=1, 2, ... K} denotes the output from the filter bank. The mel-frequency spectrum is calculated the following way:

$$c_n = \sqrt{\frac{2}{K} * \sum_{k=1}^{k} \log(S_k) * \cos\left(n * [k - 0.5] * \frac{\pi}{K}\right)}$$

where n=1, 2, 3 ... 12 is the order of the cepstrum.

The features described above forms a 20-value feature vector, the average and standard deviation is taken column wise over the whole media, and concatenated to a 40-value feature vector. A 41 variable is added to the feature vector by taking the ratio of silent frames verses total amount of frames for the whole media item.

Edge Plain Field Feature Vector

Another basic feature vector will now be defined. This is the so called edge plain field histogram (EPFH) feature vector. It is generated by two basic steps:
1. The quantisation of the colour values in the image.
2. Creation of EPFH The Quantisation of the Colour Space The process starts from a HSV (Hue Saturation Value) coded image, where $0 \leq H \leq 360$, $0 \leq S \leq 1$, $0 \leq V \leq 1$. If the image under consideration is not provided in this format, it is a straightforward (and known) mapping operation to convert it to this format.

If the HSV colour space were visualised, it would be in the form of a cone. The quantification step aims to divide the cone into different blocks. Each block is indexed with a number; the number itself is irrelevant the only function of the number is to work as an index.

The index is the value generated (or "returned") by the saturation quantisation set out first. This in turn refers to hue and luminance quantisation set out below.

The Saturation is Quantised Into 4 Parts:

| | | |
|---|---|---|
| 0.00 < Saturation ≦ 0.03 | → Achromatic | return LuminanceA |
| 0.03 < Saturation ≦ 0.33 | → Low Chromatic | return 7*LuminanceC + Hue − 1 |
| 0.33 < Saturation ≦ 0.66 | → Medium Chromatic | return (3 + LuminanceC) *7 + Hue − 1 |
| 0.66 < Saturation ≦ 1 | → High Chromatic | return (6 + LuminanceC) *7 + Hue − 1 |

In the case of the last three categories, the hue and luminance are quantised as follows:
The Hue is Quantised into 7 Non-Uniform Parts:

| | | |
|---|---|---|
| 330 < hue ≦ 22 | return 1 | //red |
| 22 < hue ≦ 45 | return 2 | //orange |
| 45 < hue ≦ 70 | return 3 | //yellow |
| 70 < hue ≦ 155 | return 4 | //green |
| 155 < hue ≦ 186 | return 5 | //cyan |
| 186 < hue ≦ 278 | return 6 | //blue |
| 278 < hue ≦ 330 | return 7 | //purple |

The LuminanceC (Value) is Quantised in 3 Parts:

| | | |
|---|---|---|
| 0.00 < Saturation ≦ 0.33 | → Low Luminance | return 0 |
| 0.33 < Saturation ≦ 0.66 | → Medium Luminance | return 1 |
| 0.66 < Saturation ≦ 1 | → High Luminance | return 2 |

In the case of a classification as "achromatic", the luminance value is quantised:
The LuminanceA (Value) is Quantised in 4 Parts in an Achromatic Region:

| | | |
|---|---|---|
| 0.00 < Luminance ≦ 0.25 | → White | return 63 |
| 0.25 < Luminance ≦ 0.50 | → Light Grey | return 64 |
| 0.50 < Luminance ≦ 0.75 | → Bark Grey | return 65 |
| 0.75 < Luminance ≦ 1 | → Black | return 66 |

The Creation of EPFH

Next, iterating through the pixels in an image, each pixel (centre pixel) is compared with its surrounding pixels (that is a group of 8 pixels). If any one of the surrounding pixels has a different colour index value than the current centre pixel then the centre pixel is considered a "edge" pixel; otherwise it is considered a plain field pixel.

To avoid confusion, the term "centre" refers to the pixel's spatial (image) position with relation to the pixels with whose colour properties it is being compared. The terms "edge" and "plain field" refer to the current centre pixel's position in colour space with reference to the spatially surrounding pixels.

If a pixel is classified as an edge pixel it is added to an "edge" histogram; otherwise it is added to a "plain field" histogram.

The bins in each of the histograms are the colour indices described above.

Post Processing of the Feature Vectors

The edge histogram and the plain field histogram are both individually normalised so their length equals 1. The ratio of edge pixels to total pixels in the image is also calculated (the "edge ratio").

The final feature vector comprise a concatenation of the normalised edge histogram, the normalised plain field histogram and the edge ratio.

Benchmarking Feature Vectors

The main aim here is to investigate how well the individual basic feature vectors correlate with genres.

For each feature vector test, calculate a confusion matrix as seen in the table below where the columns are the expected- and the rows are the actual-classification.

For each feature vector calculation, calculate the organisation accuracy as a measurement of the feature vectors precision. Also calculate its standard deviation within the organisation accuracy as a measurement of how general the feature vectors are. A high value for the standard deviation together with high organisation accuracy might symbolise that the feature vectors are very good at classifying some types of data and bad at classifying other types of data.

The experiment is conducted in the following manner:
The feature vectors are normalised column-wise with mean standard deviation normalisation. Thereafter they are evaluated.

TABLE 1

The confusion matrix is shown in the top table. The bottom table shows a list with the diagonal columns from the confusion matrix also including the Average Organisation Accuracy and the standard deviation of the Organisation Accuracy.

| | Car | Diving | Fashion | Sailing | South Pole | Train |
|---|---|---|---|---|---|---|
| Car | 96.3 | 0 | 0 | 0 | 1.85 | 1.85 |
| Diving | 0 | 100 | 0 | 0 | 0 | 0 |
| Fashion | 0 | 0 | 98.59 | 1.41 | 0 | 0 |
| Sailing | 0 | 5.56 | 22.22 | 72.22 | 0 | 0 |
| Train | 0.6 | 0 | 0 | 0.6 | 1.79 | 97.02 |

| Diagonal Values | |
|---|---|
| Car | 96.3 |
| Diving | 100 |
| Fashion | 98.6 |
| Sailing | 72.2 |
| South Pole | 61.5 |
| Train | 97 |
| Total | 526 |
| Average | 87.6 |
| StdDev | 15 |

To get robust results, each feature vector was tested 100 times. And the result is presented in the following form, as shown in Table 2:
Column 1: The feature vector's name
Column 2: Avg OA is the average of the Organisation Accuracy OA from 100 confusion matrices (this parameter shows how good the classification is). This is expressed as a percentage value.
Column 3: StdDev of Organisation Accuracy is the standard deviation of the Organisation Accuracy from 100 confusion matrices (this parameter shows how stable the classification is).
Column 4: StdDev Accuracy is the average of the standard deviation from 100 confusion matrices (this parameter shows how general the classification is).
Column 5: StdDev of StdDev Accuracy is the standard deviation of the standard deviation from 100 confusion matrices (this parameter shows how stable the classification is).
Column 6: The average of the Avg OA is calculated from all the feature vectors tested and subtracted from the Avg OA, this is to give a good overview of the success of each feature vector.

TABLE 2

Example results

| FeatureVector | Avg OA | Std Dev of OA | StdDev Accuracy | Std Dev of Std Dev Accuracy | Diff from Avg |
|---|---|---|---|---|---|
| AudioTEST | 66.40 | 1.48 | 14.2 | 1.78 | 4.36 |
| blue.avgTEST | 58.38 | 1.18 | 20.79 | 2.03 | −3.66 |
| Blue.combTEST | 61.34 | 1.61 | 16.83 | 2.53 | −0.70 |
| Average | 62.04 | | | | |

Result

The results for the TV and DV material are presented with two tables each. The first table showing the data use din the test, the second table showing the results described in the previous section.

TV

The TV test data consist of 697 five-min clips from the genres shown in Table 3.

The overall results are shown in Table 4.

TABLE 3

TV genre distribution

| Genre | Amount of media items |
|---|---|
| Animation | 84 |
| Game Show | 105 |
| News | 244 |
| Soap | 109 |
| Sport | 93 |
| Talk Show | 62 |
| Total | 697 |

TABLE 4

Results from TV feature vector bench marking

| FeatureVector | Avg OA | Std Dev of OA | StdDev Accuracy | Std Dev of Std Dev Accuracy |
|---|---|---|---|---|
| audio | 70.76 | 1.27 | 13.02 | 1.75 |
| blue.avg | 58.38 | 1.18 | 20.79 | 2.03 |
| blue.comb | 61.34 | 1.61 | 16.83 | 2.53 |
| blue.stdDev | 54.31 | 1.65 | 17.47 | 2.67 |
| brightnes.avg | 62.27 | 1.07 | 19.23 | 1.82 |
| brightnes.comb | 67.80 | 1.40 | 14.62 | 1.85 |
| brightnes.stdDev | 61.30 | 1.23 | 15.82 | 2.20 |
| facefeatures | 62.42 | 1.46 | 22.87 | 2.02 |
| facestatfeatures | 63.50 | 1.24 | 16.92 | 2.42 |
| fft.avg | 62.84 | 1.36 | 16.41 | 2.27 |
| fft.comb | 63.00 | 1.36 | 17.01 | 1.98 |
| fft.mag.avg | 63.03 | 1.24 | 16.65 | 2.19 |
| fft.mag.comb | 62.97 | 1.20 | 16.91 | 2.11 |
| fft.mag.stdDev | 62.86 | 1.50 | 16.75 | 2.30 |
| ffl.stdDev | 62.59 | 1.39 | 16.78 | 2.62 |
| green.avg | 58.28 | 1.04 | 20.93 | 2.08 |
| green.comb | 61.44 | 1.55 | 17.13 | 2.80 |
| green.std | 54.29 | 1.49 | 17.04 | 2.60 |
| hue.avg | 57.99 | 1.40 | 22.29 | 3.03 |
| hue.comb | 61.40 | 1.43 | 17.43 | 2.48 |
| hue.std | 58.78 | 1.49 | 18.12 | 2.46 |
| luminance.avg | 62.44 | 1.80 | 19.89 | 2.33 |
| luminance.comb | 62.57 | 1.51 | 16.56 | 2.25 |
| luminance.stdDev | 55.46 | 1.46 | 15.69 | 2.04 |
| red.avg | 59.42 | 1.56 | 17.10 | 2.16 |
| red.comb | 65.26 | 1.23 | 15.46 | 2.27 |
| red.stdDev | 58.15 | 1.29 | 17.90 | 2.36 |
| rgb.avg | 63.45 | 1.48 | 16.21 | 2.35 |
| rgb.comb | 66.63 | 1.41 | 18.60 | 2.37 |
| rgb.stdDev | 57.56 | 1.42 | 15.93 | 2.02 |
| Average | 61.42 | | | |

TABLE 6

Results from DV feature vector bench marking

| FeatureVector | Avg OA | Std Dev of OA | StdDev Accuracy | Std Dev of Std Dev Accuracy | Diff From Avg |
|---|---|---|---|---|---|
| audio | 87.14 | 2.38 | 14.27 | 4.15 | 21.66 |
| blue.avg | 64.43 | 1.92 | 21.52 | 3.38 | −1.05 |
| blue.comb | 63.74 | 2.05 | 19.98 | 3.73 | −1.74 |
| blue.stdDev | 56.17 | 2.60 | 16.48 | 4.29 | −9.31 |
| brightnes.avg | 66.00 | 1.96 | 16.21 | 3.61 | 0.53 |
| brightnes.avg | 64.85 | 2.07 | 19.45 | 4.25 | −0.63 |
| brightnes.comb | 56.34 | 2.15 | 17.88 | 4.32 | −9.14 |
| brightnes.stdDev | 51.25 | 2.28 | 22.47 | 3.27 | −14.22 |
| facestat fft.avg | 66.80 | 2.13 | 19.67 | 3.84 | 1.33 |
| fft.avg | 66.90 | 1.93 | 19.02 | 3.50 | 1.43 |
| fft.comb | 67.30 | 1.72 | 19.09 | 4.50 | 1.83 |
| fft.mag.avg | 67.34 | 1.88 | 18.83 | 3.64 | 1.87 |
| fft.mag.stdDev | 67.65 | 1.92 | 18.14 | 4.25 | 2.18 |
| fft.stdDev | 66.98 | 1.95 | 19.44 | 3.64 | 1.50 |
| green.avg | 64.51 | 1.87 | 21.82 | 3.40 | −0.96 |
| green.comb | 64.36 | 2.14 | 19.43 | 3.96 | −1.11 |
| green.stdDev | 55.98 | 2.16 | 17.28 | 3.63 | −9.50 |
| hue.avg | 73.41 | 2.12 | 20.87 | 3.10 | 7.93 |
| hue.comb | 72.25 | 1.90 | 24.80 | 3.90 | 6.78 |
| hue.steDev | 63.51 | 2.51 | 22.55 | 3.82 | −1.96 |
| luminance.avg | 69.36 | 2.05 | 14.34 | 4.08 | 3.88 |
| luminance.comb | 67.00 | 2.35 | 19.12 | 4.83 | 1.52 |
| luminance.std | 57.73 | 1.97 | 15.50 | 3.85 | −7.75 |
| red.avg | 71.40 | 2.04 | 14.66 | 3.46 | 5.93 |
| red.comb | 68.38 | 2.12 | 15.26 | 4.42 | 2.90 |
| red.stdDev | 58.46 | 2.11 | 12.81 | 4.42 | −7.02 |
| rgb.avg | 71.50 | 2.49 | 23.54 | 3.90 | 6.03 |
| rgb.comb | 68.17 | 2.82 | 19.04 | 4.66 | 2.70 |
| rgb.stdDev | 59.84 | 2.19 | 17.16 | 4.23 | −5.63 |
| Average | 65.47 | | | | |

Discussion

The aim of this technique was to choose basic feature vectors to use in the reduced feature vector. In this experiment there are four main types of basic feature vector classes:

Colour based
FFT based
Audio based
Face based.

The reduced feature vector should be diversified and stable so it also works for data sets not tested in this experiment; at the same time it should ideally perform better than the average feature vector for this data set. Therefore the reduced feature vector should contain data from all the main basic feature vector classes.

Colour Based Feature Vector

If one combines the results from the TV and DV material one can see that RGB is a quite good colour model for the present purpose. However, the RGB combination histogram is used, even if it is just slightly better than the RGB average alone and double as long. The reason to proceed with the combination histogram is that it gives much broader information than the average alone, and that the Hotelling transform described below will shorten the feature vector drastically anyway.

FFT Based Feature Vector

The average and standard deviation of the magnified FFT performs very well for both the TV and DV material. However the combination does not perform better than the average and standard deviation on their own. But for the same reason as in the "Colour based feature vector" the combination vector is used.

Audio Based Feature Vector

The audio feature vector performs very well for all the material, and is a good choice.

Face Based Feature Vector

We tried two different types of face feature vectors for the TV material, "face-features" and "face-statistics". The "face-statistics" were slightly better than "face-features", and much less complex to compute. The "face-features" were not tested for the DV material, but the results from the TV material give confidence to make the decision to proceed with the basic feature vectors "face-statistics".

Investigation of Redundancies Within the Feature Vectors

The compactness of the feature vectors is a very important aspect of the feature vectors. The main aim of this experiment is to investigate if our feature vectors can be represented with fewer variables.

One way to get the most important part of a vector is to use the so-called Hotelling Transform. The Hotelling Transform is based on statistical properties of the feature vectors. A transformation of a 20 variable vector will result in a 20 variable vector with the top/first variables being the one with most variance (i.e. they could be considered to be the more significant variables). This means that the transform moves the most important features in the feature vector to the beginning of the vector.

The experiment was conducted in the following way.
1. The feature vector set is normalised column wise with mean standard deviation normalisation.
2. All the feature vectors within the set are transformed with the Hotelling transform.
3. An evaluation loop starts and runs until only one variable is left in the feature vector.
    a. The last (least significant) remaining variable in the vectors is cut off or discarded.
    b. The feature vector is evaluated 10 times, and the average organisation accuracy is presented in the diagrams.

Figure 13:
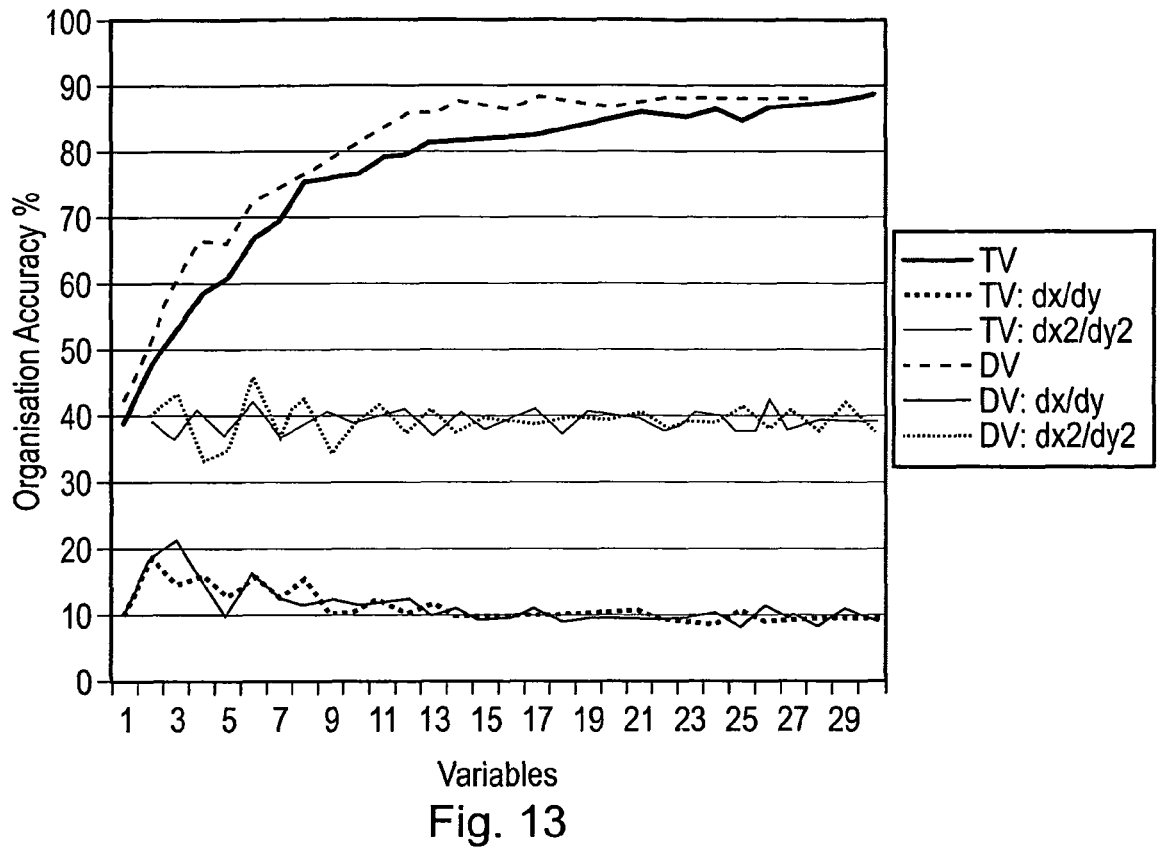
Figure 14:
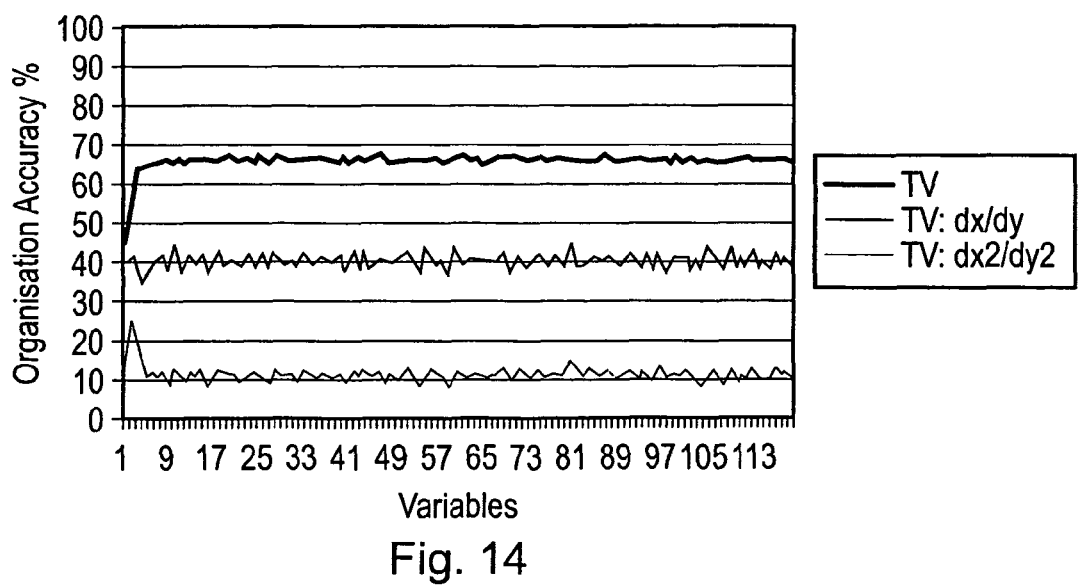

The results are shown in FIGS. 10 to 14 where the horizontal axis represents the amount of variables in the vector and the vertical axis represents the average organisation accuracy (In FIG. 13 the first and second derivatives of the organisational accuracy are also shown, rebased around vertical axis position of 10 and 40 units respectively). Representative results only are provided.

The results show that there are several variables that can be discarded, because they do not significantly contribute to the organisation accuracy. In the present embodiments the arrangement used is form a reduced feature vector by concatenating:

the first 7 variables of the 41 variable Audio vector
the first 7 variables of the 120 variable RGB combination vector
the first 10 variables of the 200 variable magnified FFT combination vector
all 6 variables from the 6 variable face statistics vector.

To derive these cut-off points analytically, it is useful to be able to derive the "knee" of each of the graphs, and to discard any feature data after that knee. This can be achieved by deriving the average gradient of the graph at a right-most region where the gradient is substantially horizontal and very slowly changing (e.g. the region from 25 to 40 variables in FIG. 10) and the gradient at a leftmost region of the graph where the gradient is far from horizontal (e.g. the region from 1 to 6 variables in FIG. 10). Where these two gradients intersect can be an indication of the knee point. A predetermined small number of additional variables (e.g. an extra two variables) can optionally be added as a safety margin.

Benchmarking of Normalisation Strategies

The SOM (below) uses Euclidian distance for training and organisation of feature vectors. To make sure that no part of the concatenated feature vector is more influential than any other it is appropriate to normalise the values for each "basic feature vector" so the values are within the same value range. There are three main strategies for the normalisation.

1. Each basic feature vector should contribute to the result equally and therefore it is useful to normalise each feature vector by its own length (a so-called vector normalisation process). (Observe that if vector normalisation is conducted after concatenation it is done on the reduced feature vector)
2. Each variable of the basic feature vectors contributes equally, therefore we normalise the feature vectors column wise with mean standard deviation normalisation or linear transformation.
3. Combination of the two above. (e.g. normalisation of columns followed by normalisation of its own length)

There are in fact 8 normalisation combinations that make sense, as shown in the table below. Observe that ALT 1 is the raw feature vector. The terms "vector", "mean" and "linear" represent vector normalisation, mean standard deviation normalisation and linear normalisation respectively.

TABLE 7

Normalisation combinations

| | Step 1 | Step 2 | Step 3 | Step 4 | Name |
|---|---|---|---|---|---|
| Alt 1 | concatenation | | | | raw |
| Alt 2 | vector | Concatenation | | | vector |
| Alt 3 | mean | Concatenation | | | mean |
| Alt 4 | linear | Concatenation | | | linear |
| Alt 5 | vector | Concatenation | vector | | vector.vector |
| Alt 6 | vector | Concatenation | mean | | mean.vector |
| Alt 7 | vector | Concatenation | linear | | linear.vector |
| Alt 8 | mean | Concatenation | vector | | vector.mean |
| Alt 9 | linear | Concatenation | vector | | vector.linear |

The description below handles the case of concatenation of full basic feature vectors and Hotelling transforming and cutting/truncating the reduced feature vector, verse Hotelling transforming and cutting the basic feature and then concatenating them, as done here.

To find the most suitable normalisation strategy, first normalise and concatenate the feature vectors defined above. Then, classify each feature vector 100 times and present the average of the results in table 8 for the TV—and table 9 for the DV-material.

TABLE 8

TV normalisation result
TV

| FeatureVector | Avg OA | Std Dev of OA | StdDev Accuracy | Std Dev of Std Dev Accuracy | Diff From Avg |
|---|---|---|---|---|---|
| raw | 75.86 | 1.44 | 12.07 | 2.03 | |
| linear | 84.06 | 1.38 | 8.93 | 1.97 | −1.49 |
| linear.vector | 84.25 | 1.44 | 8.48 | 2.14 | −1.3 |
| mean | 90.07 | 1.34 | 6.1 | 1.56 | 4.52 |
| mean.vector | 87.58 | 1.46 | 6.56 | 1.82 | 2.03 |
| vector.linear | 83.51 | 1.36 | 9.28 | 1.91 | −2.04 |
| vector.mean | 89.64 | 1.23 | 6.7 | 1.47 | 4.09 |
| vector | 82.72 | 1.42 | 8.94 | 1.92 | −2.83 |
| vector.vectort | 82.58 | 1.46 | 9.27 | 2.18 | −2.97 |

TABLE 9

DV normalisation result
DV

| FeatureVector | Avg OA | Std Dev of OA | StdDev Accuracy | Std Dev of Std Dev Accuracy | Diff From Avg |
|---|---|---|---|---|---|
| raw | 44.72 | 2.1 | 18.34 | 2.86 | |
| linear | 91.47 | 1.77 | 10.7 | 3.17 | 6.83 |
| linear.vector | 79.14 | 2.36 | 23.03 | 5.41 | −5.5 |
| mean | 89.31 | 2.57 | 14.25 | 4.68 | 4.66 |
| mean.vector | 85.78 | 2.33 | 16.81 | 4.99 | 1.13 |
| vector.linear | 91.18 | 1.86 | 10.84 | 3.5 | 6.54 |
| vector.mean | 89.02 | 2.95 | 15.5 | 5.91 | 4.38 |
| vector | 75.69 | 2.67 | 21.71 | 4.93 | −8.95 |
| vector.vectort | 75.55 | 2.47 | 22.16 | 4.36 | −9.09 |

Discussion

It can be clearly seen that vector normalisation both before and after concatenation only makes the results worse. Linear normalisation improves the results for the DV material but worsens the results for the TV material and is therefore seen as unstable between different data sets. The mean standard deviation normalisation on the other hand, performs well for both TV and DV material and is the preferred normalisation method.

Investigation of Post-Concatenation Redundancy Within Reduced Feature Vector.

In the previous sections several different methods and processes have been used to generate reduced feature vectors. The winning concept so far is to use the basic feature vectors, concatenate them and normalise them with mean standard deviation normalisation.

To investigate if the concatenation of the basic feature vectors to a reduced feature vector will cause generation of redundant data. In other words, do any of the basic feature vectors contain the same data, and can we in that case remove it?

The test is conducted the same way as the investigation of redundancies within the feature vectors described above.

Empirical results show that if the reduced feature vector were cut to half its length, the organisation accuracy would decrease with approximately 5-7% and it seems to be too big a loss of performance in this case.

There follows a definition of the preferred reduced feature vector used in the present embodiments.

Creation of Reduced Feature Vector Subparts

Colour

The basic colour feature vector consists of the average and standard deviation of a 60 bin RGB histogram (20 bin per colour) over the whole media item. This gives a feature vector consisting of 120 variables.

The colour histogram is transformed with the Hotelling transform and truncated so that the 7 first variables are kept.

Shape

Each movie frame is resized form 720*576 to 64*64 with bilinear interpolation (this will cause aliasing problems). We transform the 64*64 image with the FFT and save log of the power of the 10 lowest frequencies plus one, as seen below.

$$D(u,v)=10*\log(1+|F(u,v)|)$$

This forms a 100-value long vector. These vectors are produced for each frame, the average and standard deviation over the whole media item is used as a feature vector. This means that we have a 200-value long feature vector.

The shape feature vector is transformed with the Hotelling transform and truncated so that the 10 first variables are kept.

Audio

The audio feature is created as described above and that creates a 41-value feature vector.

Face

The face feature vector is created as described above and that creates a 6-value feature vector.

Concatenation and Normalisation

The sub-feature vectors are normalised with the mean standard deviation normalisation and concatenated. This gives us a 30-value long feature vector with the following empirical organisation accuracy:

TABLE 10

Average performance of the 30-value super vector for both TV and DV material

| FeatureVector | Avg OA | Std Dev of OA | StdDev Accuracy | Std Dev of Std Dev Accuracy |
|---|---|---|---|---|
| bbc.mean.super.txt | 88.43 | 1.43 | 7.31 | 1.67 |
| dv.mean.super.txt | 88.44 | 2.3 | 8.32 | 2.51 |

TABLE 11

Confusion matrix form evaluation with 30-value super vector using TV material.

| | Animation | Game Show | News | Soap | Sport | Talk Show |
|---|---|---|---|---|---|---|
| Animation | 95.24 | 2.38 | 1.19 | 1.19 | 0.00 | 0.00 |
| Game Show | 2.86 | 88.57 | 0.00 | 0.95 | 5.71 | 1.90 |
| News | 0.41 | 2.46 | 92.21 | 0.41 | 4.10 | 0.41 |
| Soap | 0.00 | 1.83 | 0.92 | 93.58 | 2.75 | 0.92 |
| Sport | 1.08 | 7.53 | 2.15 | 0.00 | 89.25 | 0.00 |
| Talk Show | 0.00 | 6.45 | 4.84 | 3.23 | 3.23 | 82.26 |

TABLE 12

Confusion matrix form evaluation with 30-value reduced feature vector using DV material.

| | Car | Diving | Fashion | Sailing | South Pole | Train |
|---|---|---|---|---|---|---|
| Car | 100 | 0 | 0 | 0 | 0 | 0 |
| Diving | 0 | 100 | 0 | 0 | 0 | 0 |
| Fashion | 0 | 0 | 90.14 | 9.86 | 0 | 0 |
| Sailing | 5 | 5 | 2.5 | 80 | 0 | 7.5 |
| South Pole | 0 | 0 | 15.38 | 5.77 | 76.92 | 1.92 |
| Train | 0 | 0.6 | 2.98 | 1.79 | 0.6 | 94.05 |

General Notes on the SOM

Reference is also made to the discussions of the SOM elsewhere in the present application and referenced documents.

The Self Organising Map (SOM) is a type of neural network that maps n-dimensional vectors to a two dimensional map.

The map consists of N*M nodes; each node represents a codebook before $m^t_{NM}$. When the system is initialised the codebook vectors are set to random values.

To train the map on a vector set X={x}, start by comparing x with all the codebook vectors $m^t_{NM}$ using a distance measurement, for example Euclidian distance. The winning node and the neighbours around the winning node are then modified by the following formula.

$$m_{nm}^{t+1}=m_{nm}^t+\alpha(t)(m_{nm}^t-x)$$

h(n,m) Can represent other functions such as a bubble function etc.

General Notes on the Hotelling Transform

The Hotelling transform is also known as Principal component, eigenvector and discrete Karhunen-Loéve transform. The Hotelling transform is a very useful way to reduce the redundancy within feature vectors.

Consider a population of vectors.

$$X = \begin{bmatrix} x_1 \\ x_2 \\ x_3 \\ x_4 \end{bmatrix}$$

With a mean vector $m_x = E(x)$

And a covariance matrix $C_x = E((x-m_x)(x-m_x)^T)$

If one takes the eigenvalues and the matching eigenvectors and order the eigenvectors in a order matching the decreasing values of the eigenvalues one get matrix A.

$A = eig(C_x)$

The Hotelling transform is then described with the following formula:

$y = A \cdot (x - m_x)$

Where x is transformed to y. The first dimension in the y vector has the highest variance; the second dimension has the second highest variance, etc. This is due to the fact that we organise the eigenvector with respect to the size of the eigenvalues.

General Notes on Vector Normalisation

Vector normalisation is a standard algebraic procedure, where one divides the vector by its own norm. This results in a vector of length 1.

$$v_{normalized} = \frac{v}{\|v\|}$$

$\|v_{normalized}\| = 1$

General Notes on Column Linear Transformation Normalisation

For each column one finds the min and max and transforms it to a new min and max.

$x_{new} = x_{old} \cdot a + m$ $$a = \frac{x_{new}^{max} - x_{new}^{min}}{x_{old}^{max} - x_{old}^{min}}$$

$m = x_{new}^{max} - x_{old}^{max} \cdot a$

General Notes on Mean and Standard Deviation Normalisation

Mean and Standard deviation normalisation is a type of column normalisation. The mean and standard deviation is taken column wise. Each value is then translated by the mean and divided by the standards deviation for that column.

$$x_{new} = \frac{(x_{old} - \text{mean})}{stdDev}$$

Investigation of Alternative Method

An experiment investigated if there was any advantage to transform the vectors set with Hotelling transform, shorten by the vectors and then concatenating them compared to concatenating the vectors, Hotelling transforming them and then shortening the final feature vector.

Method

In this experiment two types of feature vector were compared with each other: "pre-" and "post-" concatenation cut feature vectors. The methods to derive these are the following:

Pre-Concatenation Cut Feature Vector

Each basic feature vector is transformed by the Hotelling transform, cut off by its redundancy "knee" (as seen above), and normalised with mean standard deviation normalisation. All basic feature vectors are then concatenated to form one big feature vector.

Post-Concatenation Cut Feature Vector

Each basic feature vector is normalised with mean standard deviation normalisation, concatenated to form one big feature vector. The big feature vector is then transformed with the Hotelling transform and cut to the same length as the pre-concatenation cut feature vector.

The organisation accuracy is then calculated ten times for each feature vector and the average is presented in the table below.

Result

| FeatureVector | FeatureVector | FeatureVector | FeatureVector | Pre Cut | Post Cut | Diff from Avg |
|---|---|---|---|---|---|---|
| audio | facestatfeatures | fftMag | rgb.comb | 90.7 | 85.7 | 5 |
| audio | facestatfeatures | fftMag |  | 86.3 | 86.2 | 0.1 |
| audio | facestatfeatures |  | rgb.comb | 89.2 | 83.1 | 6.1 |
| audio |  | fftMag | rgb.comb | 89.3 | 86.7 | 2.6 |
|  | facestatfeatures | fftMag | rgb.comb | 84.6 | 79 | 5.6 |
| audio | facestatfeatures |  |  | 82.3 | 79.6 | 2.7 |
| audio |  | fftMag |  | 84.1 | 83.9 | 0.2 |
| audio |  |  | rgb.comb | 87.3 | 81.5 | 5.8 |
|  | facestatfeatures | fftMag |  | 75.7 | 75.1 | 0.6 |
|  | facestatfeatures |  | rgb.comb | 80.5 | 72.1 | 8.4 |
|  |  | fftMag | rgb.comb | 74.3 | 73.2 | 1.1 |
|  |  |  |  |  | Average D | 3.472727273 |

It can be seen that there is an advantage to first transforming the basic feature vectors with the Hotelling Transform, shortening them and then concatenating them, compared to first concatenating them and then Hotelling transforming the reduced feature vector and cutting the reduced feature vector.

As mentioned above, once the "reduced" feature vectors have been generated for the information item collection, thus defining the collection's information space, they are projected into a two-dimensional SOM at a step 150 to create a semantic map. The following section explains the process of mapping to 2-D by clustering the feature vectors using a Kohonen self-organising map. Reference is also made to FIG. 3.

A Kohonen Self-Organising map is used to cluster and organise the feature vectors that have been generated for each of the documents.

A self-organising map consists of input nodes 170 and output nodes 180 in a two-dimensional array or grid of nodes illustrated as a two-dimensional plane 185. There are as many input nodes as there are values in the feature vectors being used to train the map. Each of the output nodes on the map is connected to the input nodes by weighted connections 190 (one weight per connection).

Initially each of these weights is set to a random value, and then, through an iterative process, the weights are "trained". The map is trained by presenting each feature vector to the input nodes of the map. The "closest" output node is calculated by computing the Euclidean distance between the input vector and weights of each of the output nodes.

The closest node is designated the "winner" and the weights of this node are trained by slightly changing the values of the weights so that they move "closer" to the input vector. In addition to the winning node, the nodes in the neighbourhood of the winning node are also trained, and moved slightly closer to the input vector.

It is this process of training not just the weights of a single node, but the weights of a region of nodes on the map, that allow the map, once trained, to preserve much of the topology of the input space in the 2-D map of nodes.

Once the map is trained, each of the documents can be presented to the map to see which of the output nodes is closest to the input feature vector for that document. It is unlikely that the weights will be identical to the feature vector, and the Euclidean distance between a feature vector and its nearest node on the map is known as its "quantisation error".

By presenting the feature vector for each document to the map to see where it lies yields and x, y map position for each document. These x, y positions when put in a look up table along with a document ID can be used to visualise the relationship between documents.

Finally, a dither component is added at a step 160, which will be described with reference to FIG. 4 below.

A potential problem with the process described above is that two identical, or substantially identical, information items may be mapped to the same node in the array of nodes of the SOM. This does not cause a difficulty in the handling of the data, but does not help with the visualisation of the data on display screen (to be described below). In particular, when the data is visualised on a display screen, it has been recognised that it would be useful for multiple very similar items to be distinguishable over a single item at a particular node. Therefore, a "dither" component is added to the node position to which each information item is mapped. The dither component is a random addition of ±½ of the node separation. So, referring to FIG. 4, an information item for which the mapping process selects an output node 200 has a dither component added so that it in fact may be mapped to any node position within the area 210 bounded by dotted lines on FIG. 4.

Figure 4:
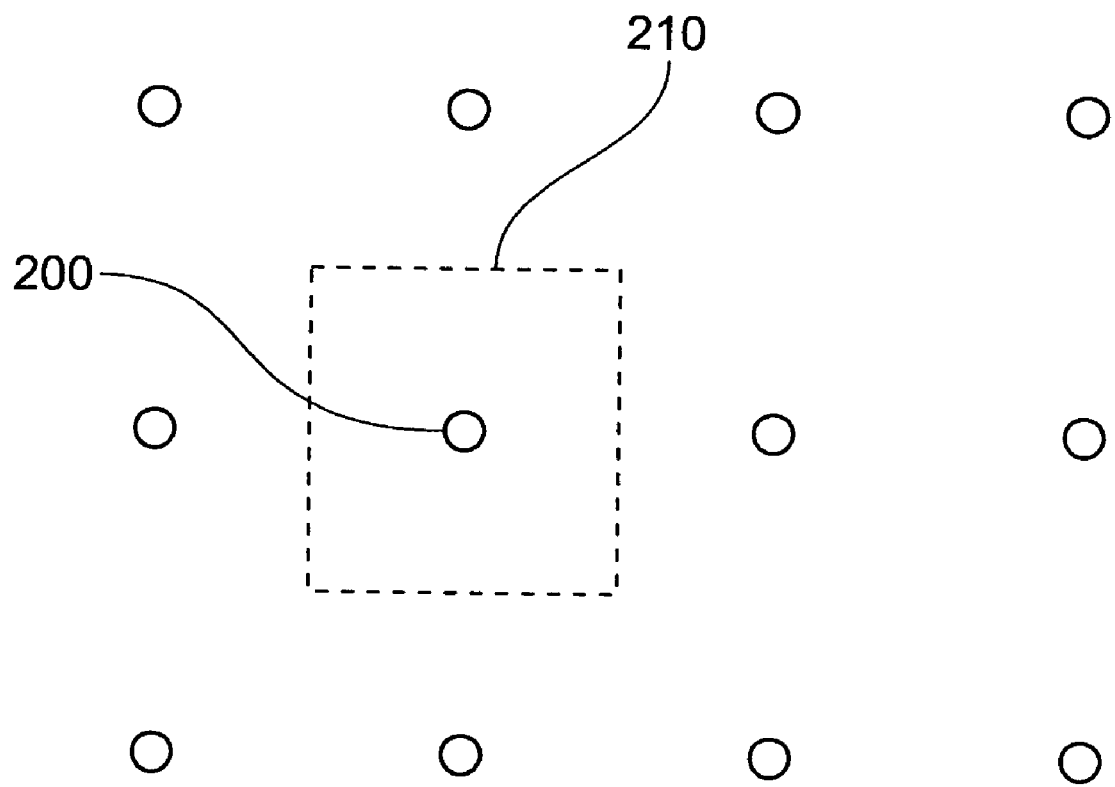
FIG. 4 schematically illustrates a dither process.

So, the information items can be considered to map to positions on the plane of FIG. 4 at node positions other than the "output nodes" of the SOM process.

An alternative approach might be to use a much higher density of "output nodes" in the SOM mapping process described above. This would not provide any distinction between absolutely identical information items, but may allow almost, but not completely, identical information items to map to different but closely spaced output nodes.

Figure 5:
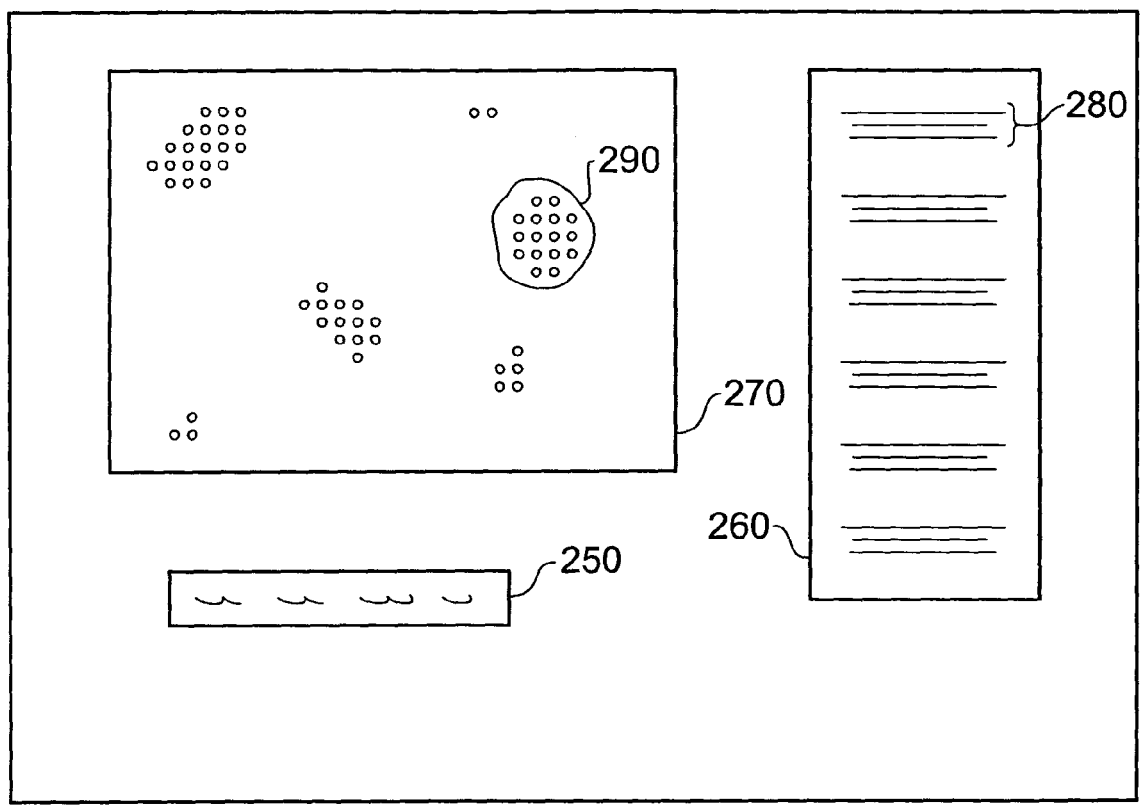
FIGS. 5 to 7 schematically illustrate display screens providing a user interface to access information represented by the SOM.

FIG. 5 schematically illustrates a display on the display screen 60 in which data sorted into an SOM is graphically illustrated for use in a searching operation. The display shows a search enquiry 250, a results list 260 and an SOM display area 270.

In operation, the user types a key word search enquiry into the enquiry area 250. The user then initiates the search, for example by pressing enter on the keyboard 70 or by using the mouse 80 to select a screen "button" to start the search. The key words in the search enquiry box 250 are then compared with the information items in the database using a standard keyword search technique. This generates a list of results, each of which is shown as a respective entry 280 in the list view 260. Also, each result has a corresponding display point on the node display area 270.

Because the sorting process used to generate the SOM representation tends to group mutually similar information items together in the SOM, the results for the search enquiry generally tend to fall in clusters such as a cluster 290. Here, it is noted that each point on the area 270 corresponds to the respective entry in the SOM associated with one of the results in the result list 260; and the positions at which the points are displayed within the area 270 correspond to the array positions of those nodes within the node array.

Figure 6:
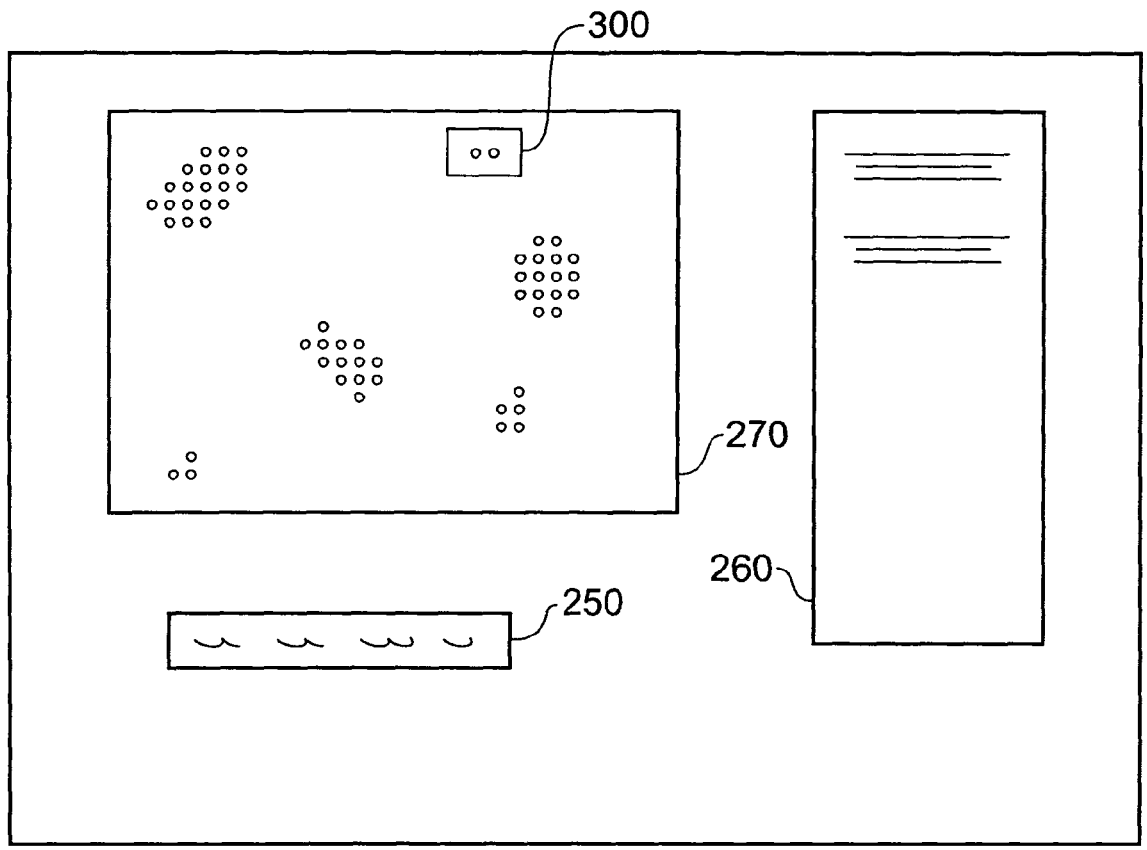

FIG. 6 schematically illustrates a technique for reducing the number of "hits" (results in the result list). The user makes use of the mouse 80 to draw a box 300 around a set of display points corresponding to nodes of interest. In the results list area 260, only those results corresponding to points within the box 300 are displayed. If these results turn out not to be of interest, the user may draw another box encompassing a different set of display points.

It is noted that the results area 260 displays list entries for those results for which display points are displayed within the box 300 and which satisfied the search criteria in the word search area 250. The box 300 may encompass other display positions corresponding to populated nodes in the node array, but if these did not satisfy the search criteria they will not be displayed and so will not form part of the subset of results shown in the box 260.

Figure 7:
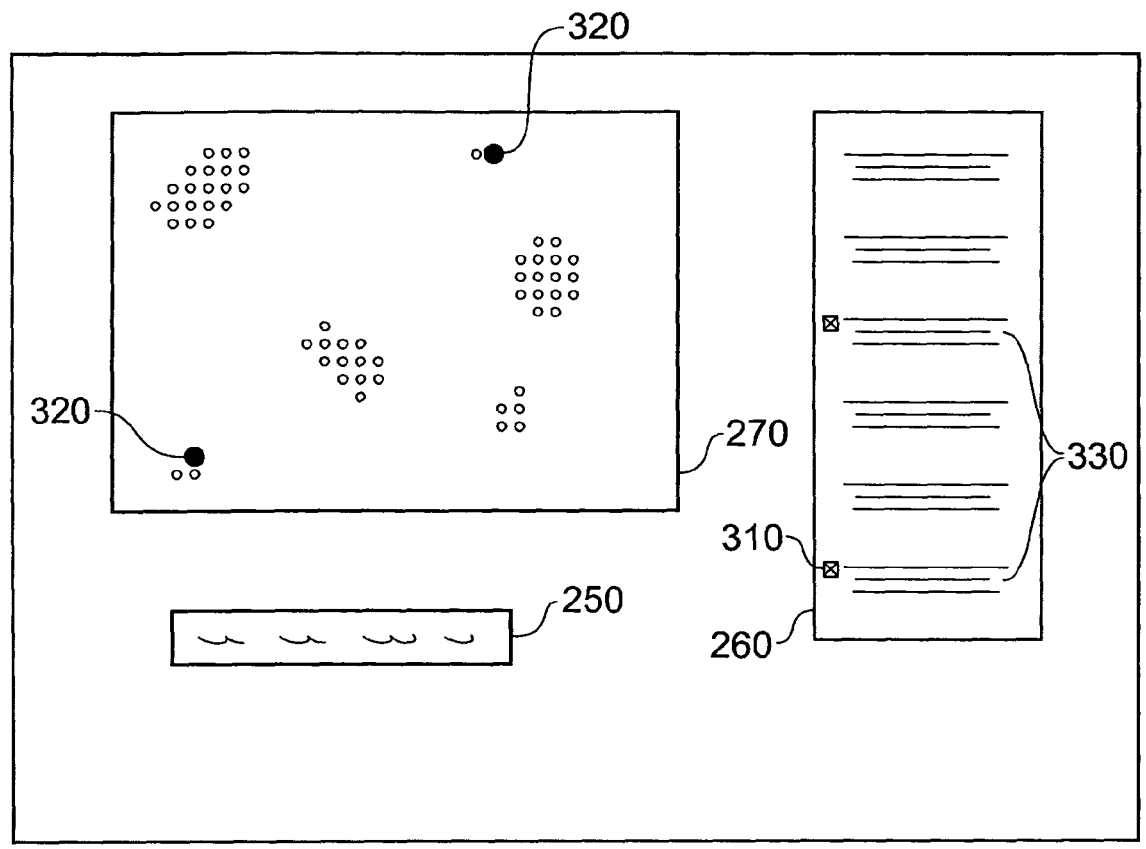

FIG. 7 schematically illustrates a technique for detecting the node position of an entry in the list view 260. Using a standard technique in the field of graphical user interfaces, particularly in computers using the so-called "Windows" ™ operating system, the user may "select" one or more of the entries in the results list view. In the examples shown, this is done by a mouse click on a "check box" 310 associated with the relevant results. However, it could equally be done by clicking to highlight the whole result, or by double-clicking on the relevant result and so on. As a result is selected, the corresponding display point representing the respective node in the node array is displayed in a different manner. This is shown schematically for two display points 320 corresponding to the selected results 330 in the results area 260.

The change in appearance might be a display of the point in a larger size, or in a more intense version of the same display colour, or in a different display colour, or in a combination of these varying attributes.

At any time, a new information item can be added to the SOM by following the steps outlined above (i.e. steps 110 to 140) and then applying the resulting reduced feature vector to the "pre-trained" SOM models, that is to say, the set of SOM models which resulted from the self-organising preparation of the map. So, for the newly added information item, the map is not generally "retrained"; instead steps 150 and 160 are used with all of the SOM models not being amended. To retrain the SOM every time a new information item is to be added is computationally expensive and is also somewhat unfriendly to the user, who might grow used to the relative positions of commonly accessed information items in the map.

Note that information stored at the time of preparing the original mapping, defining which feature data was retained and which discarded by the principal component detection process, is useful to allow corresponding reduced feature vectors to be generated in respect of the newly mapped item. The same applies to a search queries based on properties of the A/V material (e.g. "find more material like this").

However, there may well come a point at which a retraining process is appropriate. For example, if new terms (perhaps new items of news, or a new technical field) have entered into the dictionary since the SOM was first generated, they may not map particularly well to the existing set of output nodes. This can be detected as an increase in a so-called "quantisation error" detected during the mapping of newly received information item to the existing SOM. In the present embodiments, the quantisation error is compared to a threshold error amount. If it is greater than the threshold amount then either (a) the SOM is automatically retrained, using all of its original information items and any items added since its creation; or (b) the user is prompted to initiate a retraining process at a convenient time. The retraining process uses the feature vectors of all of the relevant information items and reapplies the steps 150 and 160 in full.

Figure 8:
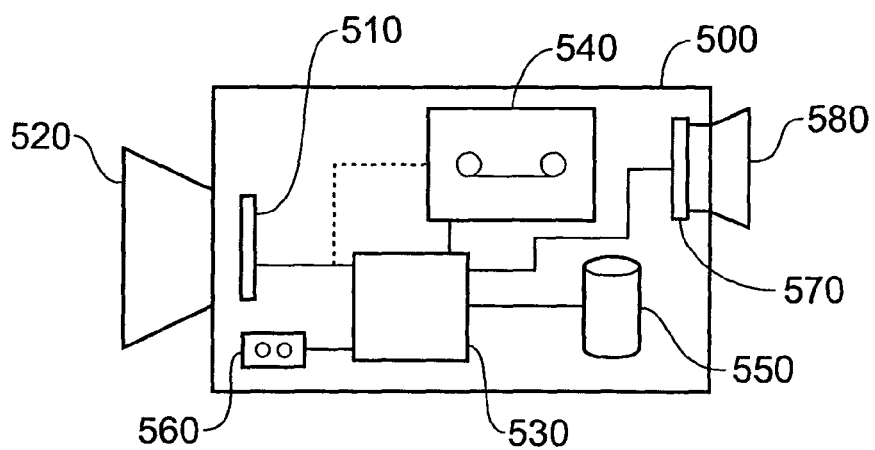
FIG. 8 schematically illustrates a camcorder as an example of a video acquisition and/or processing apparatus.

FIG. 8 schematically illustrates a camcorder 500 as an example of a video acquisition and/or processing apparatus, the camcorder including an image capture device 510 with an associated lens 520; a data/signal processor 530; tape storage 540; disk or other random access storage 550; user controls 560; and a display device 570 with eyepiece 580. Other features of conventional camcorders or other alternatives (such as different storage media or different display screen arrangements) will be apparent to the skilled man. In use, MetaData relating to captured video material may be stored on the storage 550, and an SOM relating to the stored data viewed on the display device 570 and controlled as described above using the user controls 560.

Figure 9:
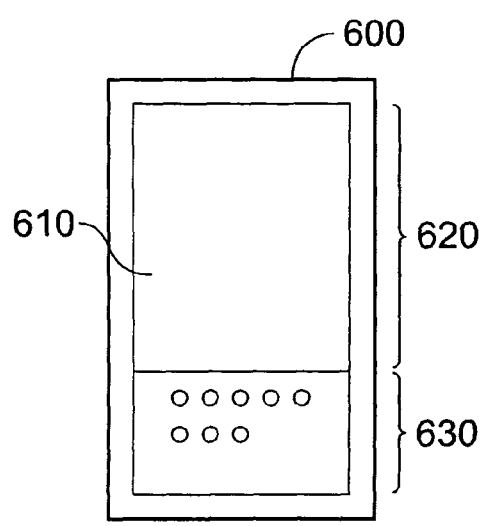
FIG. 9 schematically illustrates a personal digital assistant as an example of portable data processing apparatus.
Figure 10:
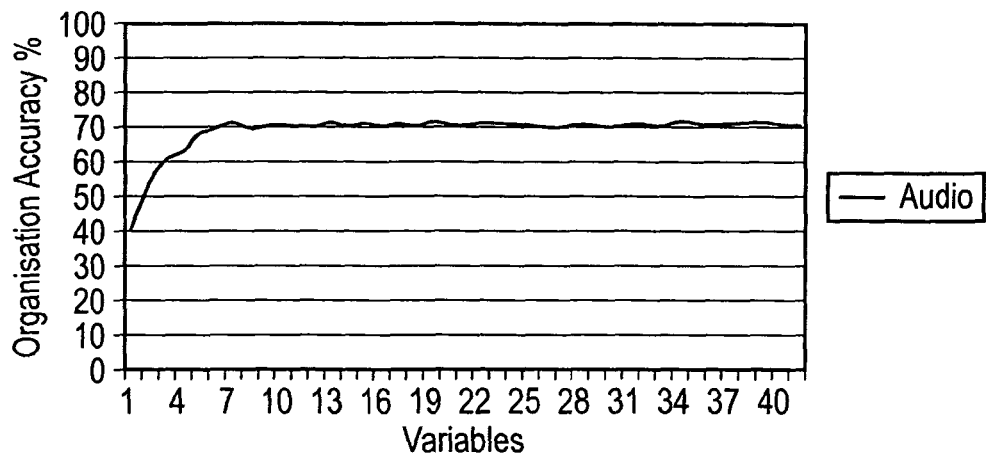
FIGS. 10 to 14 show empirical results for feature vectors having had less significant variables discarded.
Figure 11:
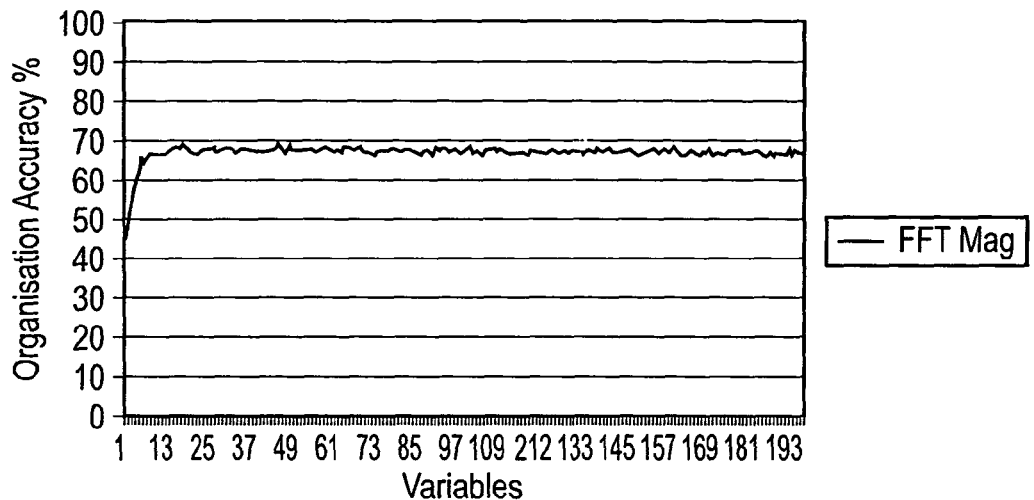
Figure 12:
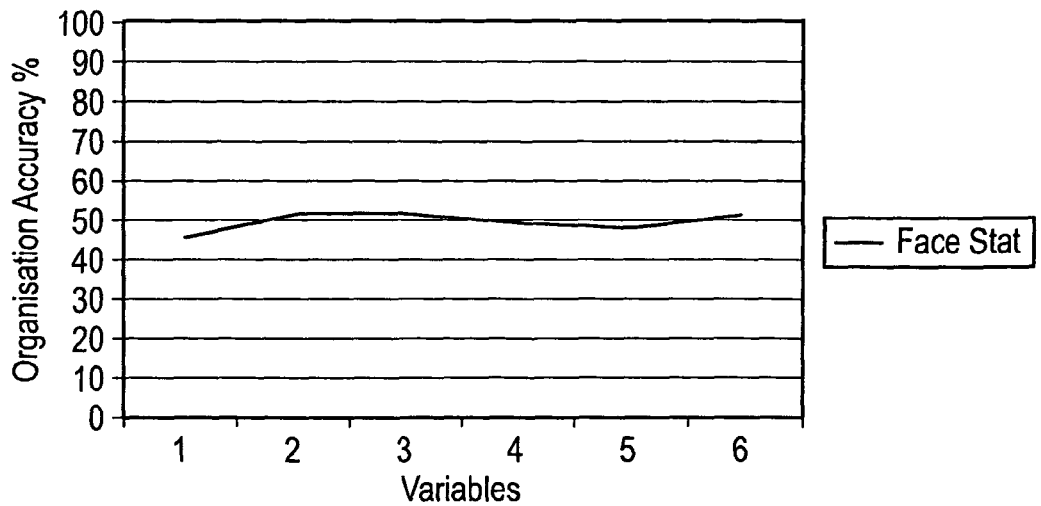

FIG. 9 schematically illustrates a personal digital assistant (PDA) 600, as an example of portable data processing apparatus, having a display screen 610 including a display area 620 and a touch sensitive area 630 providing user controls; along with data processing and storage (not shown). Again, the skilled man will be aware of alternatives in this field. The PDA may be used as described above in connection with the system of FIG. 1.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An information handling method performed by an information processing device to map information items to respective nodes in an array of nodes by mutual similarity of said information items, such that similar information items map to nodes at similar positions in said array of nodes; a mapping relationship being defined between feature data elements relating to an information item and nodes in said array of nodes; each feature data element belonging to one of a plurality of feature classes; said method comprising the steps of:
for each of a group of information items:
detecting, at a processor, from an information item, feature data elements representing each of a set of properties of that information item;
for the ensemble of feature data elements corresponding to said group of information items:
detecting, at the processor, more significant and less significant properties in respect to each feature class within said ensemble, at least one property being detected as a less significant property;
associating, at the processor, said feature data elements relating to more significant properties in respect to each feature class;
concatenating, at the processor, only said associated feature data elements relating to more significant properties so as to generate a reduced feature vector for each information item, the reduced feature vector including only more significant properties; and
defining, at the processor, a mapping between said reduced feature vectors and nodes in said array of nodes.

2. The method according to claim 1, in which:
said information items comprise audio and/or video material items; and
said properties comprise audio and/or video properties of said material items.

3. The method according to claim 1, in which said step of detecting more significant and less significant properties uses a principal component analysis technique.

4. The method according to claim 3, in which said step of detecting more significant and less significant properties uses a Hotelling Transform technique.

5. The method according to claim 1, in which said step of detecting more and less significant feature data elements is carried out in respect of individual properties or sub-groups of properties.

6. The method according to claim 1, in which said set of properties includes one or more properties selected from the list comprising:
hue statistical distribution;
luminance statistical distribution;
brightness statistical distribution;
colour component statistical distribution;
image shape;
face detection statistics;
audio power;
audio sub-band powers;
audio brightness;
audio bandwidth;
audio pitch;
audio mel-frequency properties; and
colour space pixel position properties.

7. The method according to claim 1, comprising the step of discarding feature data elements relating to less significant properties.

8. The method according to claim 1, comprising the step of determining which feature data elements are more and less significant by the steps of:
for each of a test group of information items having a known desired mapping to nodes in said array:
detecting feature data elements representing each of a set of properties of that information item;
for the ensemble of feature data elements corresponding to said test group of information items:
detecting an order of significance within said feature data elements or within sub-categories of said feature data elements;
for at least two values of n, associating feature data elements relating to the n most significant properties so as to generate a reduced feature vector for each information item;
defining a mapping between said reduced feature vectors and nodes in said array of nodes; and
detecting a degree of difference between said mapping defined using reduced feature vectors for each value of n and said known desired mapping.

9. The method according to claim 8, comprising the step of detecting a boundary between more significant and less significant feature data elements by detecting a value of n at which an increase to the next highest value of n produces less than a threshold change in said degree of difference between said mapping defined using reduced feature vectors and said known desired mapping.

10. A non-transitory computer-readable storage medium storing computer program code, which when executed by an information processing device, causes the information processing device to perform the method of claim 1.

11. The medium according to claim 10, said medium being a local medium.

12. The method according to claim 1, comprising the step of storing data defining which less significant properties were not used in said reduced feature vector in respect of a group of information items.

13. The method according to claim 12, in which, in respect of a search query to be newly mapped to a node using a mapping associated with a current group of information items: defining, as part of said search query, feature data elements representing each of at least those information item properties which were used in said reduced feature vector in respect of the current group of information items; associating said defined feature data elements so as to form a reduced feature vector corresponding to said search query to be newly mapped.

14. The method according to claim 12, comprising the step of:
in respect of an information item to be newly mapped to a node using a mapping associated with a current group of information items:
detecting feature data elements representing each of at least those information item properties which were used in said reduced feature vector in respect of said current group of information items;
associating said detected feature data elements so as to form a reduced feature vector corresponding to said information item to be newly mapped.

15. The method according to claim 14, comprising the steps of:
deriving an error quantity dependent upon a mapping error between said newly mapped information item and the node to which it is mapped;
detecting whether said error quantity indicates an error greater than a threshold error; and, if so, initiating a remapping of said ensemble of information items including said newly mapped information item.

16. The method according to claim 15, in which said error quantity depends on a Euclidean distance between said reduced feature vector corresponding to said newly mapped node and the node to which said newly mapped information item is mapped.

17. The method according to claim 15, in which a remapping is initiated only when said error quantity relating to a predetermined number of newly mapped information items has exceeded said threshold error amount.

18. The method according to claim 17, in which a remapping is initiated only when said error quantity relating to a predetermined number of newly mapped information items has exceeded said threshold error amount and those information items, taken together, have been mapped within no longer than a threshold time period.

19. The method according to claim 15, in which a remapping step includes repeating said step of detecting more significant and less significant properties.

20. The method according to claim 1, wherein the reduced feature vector for each information item is projected into a two-dimensional self-organizing map to create a semantic map.

21. An information handling system in which information items are mapped to respective nodes in an array of nodes by mutual similarity of said information items, such that similar information items map to nodes at similar positions in said array of nodes; a mapping relationship being defined between feature data elements relating to an information item and nodes in said array of nodes; each feature data element belonging to one of a plurality of feature classes; said system comprising:
a first detector to detect feature data elements representing each of a set of properties of each of a group of information items;
a second detector to detect more significant and less significant properties in respect to each feature class within the ensemble of feature data elements corresponding to said group of information items, at least one property being detected as a less significant property;
a first logic to associate said feature data elements relating to more significant properties in respect to each feature class;
a second logic to concatenate only said associated feature data elements relating to more significant properties so as to generate a reduced feature vector for each information item, the reduced feature vector including only more significant properties; and
mapping logic to define a mapping between said reduced feature vectors and nodes in said array of nodes.

22. A portable data processing device comprising a system according to claim 21.

23. Video acquisition and/or processing apparatus comprising a system according to claim 21.